US009153288B2

(12) United States Patent
Yin

(10) Patent No.: US 9,153,288 B2
(45) Date of Patent: Oct. 6, 2015

(54) RECORDABLE DISPLAY APPARATUS

(71) Applicant: Nan-Jiun Yin, Hsin-Chu (TW)

(72) Inventor: Nan-Jiun Yin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/155,340

(22) Filed: Jan. 14, 2014

(65) Prior Publication Data

US 2014/0199042 A1    Jul. 17, 2014

(30) Foreign Application Priority Data

Jan. 16, 2013   (CN) .......................... 2013 1 0015344

(51) Int. Cl.
*H04N 5/91*     (2006.01)
*G11B 27/10*    (2006.01)

(52) U.S. Cl.
CPC . *G11B 27/10* (2013.01); *H04N 5/91* (2013.01)

(58) Field of Classification Search
None
See application file for complete search history.

(56) References Cited

U.S. PATENT DOCUMENTS

| 6,827,447 | B2 | 12/2004 | Wu |
| 6,966,651 | B2 | 11/2005 | Johnson |
| 7,052,136 | B2 | 5/2006 | Johnson |
| 7,303,282 | B2 | 12/2007 | Dwyer et al. |
| 2008/0225180 | A1* | 9/2008 | Callway et al. ............... 348/725 |
| 2009/0029694 | A1* | 1/2009 | Kano et al. .................. 455/422.1 |
| 2010/0001928 | A1* | 1/2010 | Nutaro .............................. 345/8 |
| 2012/0218377 | A1* | 8/2012 | Oku ................................ 348/36 |

* cited by examiner

*Primary Examiner* — William C Vaughn, Jr.
*Assistant Examiner* — Eileen Adams
(74) *Attorney, Agent, or Firm* — Jianq Chyun IP Office

(57) ABSTRACT

The invention provides a recordable display apparatus, which uses a converting unit to convert the digital image signal into a specific image signal, in which the specific image signal has a signal format acceptable by the multimedia processor. The multimedia processor is used for integrating the specific image signal and the sound signal produced by the sound-receiving unit during receiving and recording the ambient sound into an audio/video (AV) recording data.

9 Claims, 3 Drawing Sheets

RECORDABLE DISPLAY APPARATUS

CROSS-REFERENCE TO RELATED APPLICATION

This application claims the priority benefit of China application serial no. 201310015344.5, filed on Jan. 16, 2013. The entirety of the above-mentioned patent application is hereby incorporated by reference herein and made a part of this specification.

BACKGROUND OF THE INVENTION

1. Field of the Invention

The invention generally relates to a recordable display apparatus, and more particularly, to a display apparatus with audio/video (AV) recording function.

2. Description of Related Art

The projector is used as a display apparatus for producing a large-size image. The imaging principle of a projector is based on converting an illumination beam generated by a light source module into an image beam through a light valve, and then, projecting the image beam onto a screen or wall through a projection lens so as to form images. With the advances in projection technology and lower manufacturing costs, the application of the projector has been gradually expanded to domestic purposes from commercial purpose.

Although today it is very convenient to play image information such as the briefing or movie in a meeting or class by using the projector, however, during the process of the meeting or class, participants are often unable to catch recording the speech content of the meeting host or teaching presentation. At the time, the above-mentioned problem can be solved by additionally erecting a video camera, but it is troublesome to erect the video camera on site and the effect of the recorded projection image is limited (for example, the clarity is not good and it is affected by the brightness of the ambient light in site).

U.S. Pat. No. 7,303,282 discloses a multimedia display apparatus, used to produce image signal and audio signal when a projection apparatus is electrically connected to a docking station. U.S. Pat. No. 6,827,447 discloses a recordable projector. U.S. Pat. Nos. 6,966,651 and 7,052,136 disclose a portable multimedia projection system, which includes a portable housing, a media player, a sound system, a projection apparatus, a controller and a damping apparatus, wherein the sound system has at least one internally-mounted speaker.

SUMMARY OF THE INVENTION

Accordingly, the invention is directed to a display apparatus able to simultaneously record projected image frames and ambient sound so as to advance the convenience in use of the display apparatus.

Other objectives and advantages of the invention should be further indicated by the disclosures of the invention, and omitted herein for simplicity.

To achieve the above-mentioned or other objectives, the invention provides a recordable display apparatus, which includes a displaying unit, a multimedia processor, a converting unit and a sound-receiving unit. The displaying unit displays at least one image frame according to a digital image signal. The converting unit is electrically connected to the multimedia processor and converts the digital image signal into a specific image signal, in which the specific image signal has a signal format acceptable by the multimedia processor. The sound-receiving unit is electrically connected to the multimedia processor for receiving the ambient sound of the environment where the recordable display apparatus is located in so as to produce a sound signal, in which the multimedia processor integrates the specific image signal and the sound signal into an audio/video (AV) recording data.

In an embodiment of the invention, the recordable display apparatus further includes a scaling unit for receiving an image signal from a host device and converting the image signal into the digital image signal in a signal format corresponding to the signal format of the displaying unit.

In an embodiment of the invention, the scaling unit further outputs the AV recording data produced by the multimedia processor to the displaying unit so that the displaying unit displays the AV recording data.

In an embodiment of the invention, the display apparatus further includes a wireless transmission unit electrically connected to the multimedia processor and the scaling unit, in which the multimedia processor and the scaling unit perform data transmission with the host device through the wireless transmission unit.

In an embodiment of the invention, the display apparatus further includes a storage unit electrically connected to the multimedia processor to store the AV recording data.

An embodiment of the invention also provides a recordable projection apparatus which includes an opto-mechanical unit, a multimedia processor, a converting unit and a sound-receiving unit. The converting unit is electrically connected to the multimedia processor and converts the digital image signal into a specific image signal, in which the specific image signal has a signal format acceptable by the multimedia processor. The sound-receiving unit is electrically connected to the multimedia processor for receiving the ambient sound of the environment where the recordable projection apparatus is located in so as to produce a sound signal, and the multimedia processor integrates the specific image signal and the sound signal into an AV recording data.

In an embodiment of the invention, the recordable projection apparatus further includes a scaling unit for receiving an image signal from a host device and converting the image signal into the digital image signal in a signal format corresponding to the signal format of the opto-mechanical unit.

In an embodiment of the invention, the scaling unit further outputs the AV recording data produced by the multimedia processor to the opto-mechanical unit so that the opto-mechanical unit displays the AV recording data.

In an embodiment of the invention, the recordable projection apparatus further includes a storage unit electrically connected to the multimedia processor for storing the AV recording data.

In an embodiment of the invention, the host device includes mobile phone, notebook computer, tablet computer, personal computer or game console.

In an embodiment of the invention, the storage unit includes flash drive, memory card, recordable compact disc, hard drive or solid-state drive.

Based on the description above, in the embodiment of the invention, the converting unit converts the digital image signal into a specific image signal in an acceptable signal format by the multimedia processor. The multimedia processor is used to integrate the specific image signal and the sound signal produced by the sound-receiving unit during receiving and recording the ambient sound into an AV recording data so as to advance the convenience in use of the recordable display apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

The above-mentioned or other relevant technical principles and the features and effects thereof are clearly depicted together with the accompanying drawings in the following depicted embodiments. Note that some of expression words hereinafter regarding direction or orientation, such as 'up', 'down', 'left', 'right', 'front', 'behind', and the like, are to describe, not to limit, the invention.

Figure 1:
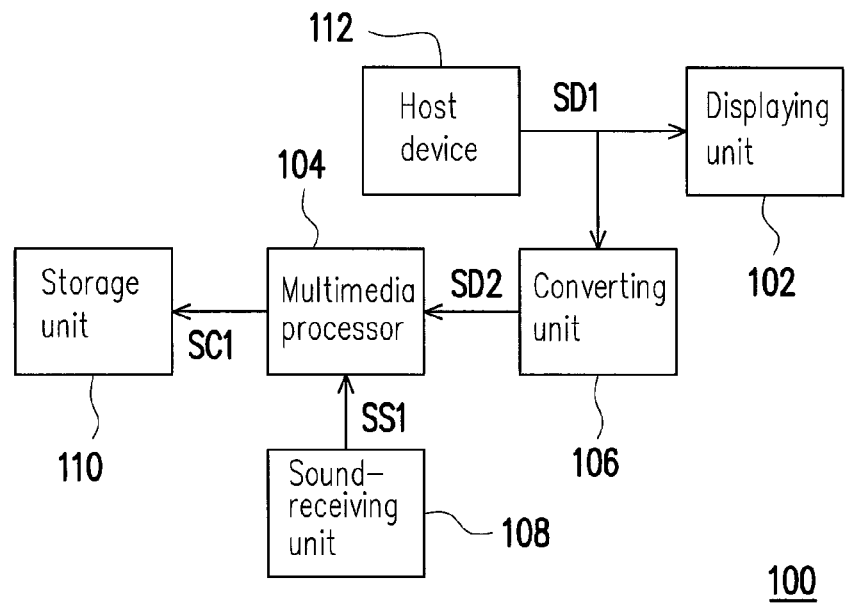
FIG. 1 is a schematic diagram of a recordable display apparatus according to an embodiment of the invention.

FIG. 1 is a schematic diagram of a recordable display apparatus according to an embodiment of the invention. Referring to FIG. 1, a recordable display apparatus 100 is, for example, an equipment such as a projection apparatus or an LCD apparatus for displaying image frames. The recordable display apparatus 100 includes a displaying unit 102, a multimedia processor 104, a converting unit 106, a sound-receiving unit 108, a storage unit 110 and a host device 112. The displaying unit 102 herein is electrically connected to the converting unit 106, the multimedia processor 104 is electrically connected to the converting unit 106, the sound-receiving unit 108 and the storage unit 110, and the host device 112 is coupled to the displaying unit 102 and the converting unit 106. The displaying unit 102 is used for displaying image frames according to a digital image signal SD1 from the host device 112. In the actual application of projection apparatus, the displaying unit 102 can be, for example, an opto-mechanical unit 302 described later referring to FIG. 3; in the actual application of LCD apparatus, the displaying unit 102 can be, for example, an LCD (liquid crystal display) panel. The converting unit 106 converts the digital image signal SD1 into a specific image signal SD2, in which the specific image signal SD2 has an acceptable signal format by the multimedia processor 104. The sound-receiving unit 108 is, for example, a microphone for receiving the ambient sound of the environment where the recordable display apparatus 100 (for example, a projection apparatus or an LCD apparatus) is located in so as to produce a sound signal SS1 according to the received ambient sound. The multimedia processor 104 integrates the specific image signal SD2 conforming to the signal format thereof and the sound signal SS1 produced by the sound-receiving unit 108 into an AV recording data SC1 and stores the AV recording data SC1 into the storage unit 110.

The storage unit 110 can be a storage apparatus fixed in the recordable display apparatus 100, such as hard drive, solid-state drive, etc. or swapping storage apparatus such as flash drive, memory card (such as PCMCIA card, CF card, SM card, MMC card, SD card, MS card, etc.) or recordable compact disc (CD-R, CD-RW, DVD-RW, DVD-RAM, etc.). In some embodiments, the storage unit 110 can simultaneously include a storage apparatus fixed in the recordable display apparatus 100 and a swapping storage apparatus.

As described above, in the embodiment, the converting unit 106 performs the signal format-converting on the digital image signal SD1 to produce the specific image signal SD2 conforming to the signal format of the multimedia processor 104. The multimedia processor 104 is used to integrate the specific image signal SD2 and the sound signal SS1 produced by the sound-receiving unit 108 during receiving and recording the ambient sound into the AV recording data SC1. And the AV recording data SC1 is stored into the storage unit 110 fixed in the display apparatus 100 for the user to access, or is directly stored into a portable storage unit 110 (for example, flash drive or memory card).

In this way, through integrating the displaying image frames of the recordable display apparatus 100 and the ambient sound into the AV recording data SC1, the user can record the operating situation of the recordable display apparatus 100, such as speech content of the meeting host or teaching content of the class teacher. Since the ambient sound is received and recorded by the sound-receiving unit 108, all the interactions between the meeting host and the meeting participants or between the class teacher and the students are recorded by the sound-receiving unit 108 as well. As a result, the meeting participants or students do not worry about failing to catch the meetings or class content due to insufficient time. On the other hand, the parents of the students can be noticed of their school progress, learning situation, etc. by using the AV recording data SC1 so as to help schoolwork and learning of the students.

In addition, the multimedia processor 104 is the signal source of the directly recorded image frames displayed by the displaying unit 102. Therefore the class circumstance can be captured without additionally erecting a video camera. In particular, there is no influence of the environmental factors (such as poor screen resolution, too weak ambient light, or blocking the displaying frame by walking people) to cause the display apparatus 100 unclearly recording the displayed image frames. And, the meeting host or the teacher can use mouse, touchpad, interactive electronic whiteboard, touch stylus and other peripherals disposed with the apparatus (for example, PC) as the signal source to edit the content (for example, marking highlights on the teaching slides by using a tablet) in file archives (for example, projection slides, etc.) displayed by the displaying unit, which plus the PIP (picture in picture) application can be recorded into the AV recording data as well. Thus, the meeting and class circumstance can be recorded down in details, which largely advances the convenience in use of the recordable display apparatus 100.

In some embodiments, a control panel 204 (shown in FIG. 2) can be disposed on the recordable display apparatus 100. The user can control the multimedia processor 104 through the control panel 204 to output the AV recording data SC1 to the displaying unit 102, so that the displaying unit 102 displays the AV recording data SC1 stored in the storage unit 110 and the user can watch the AV recording result later (in the projection application, the displaying unit is used to project the AV recording data SC1).

Figure 2:
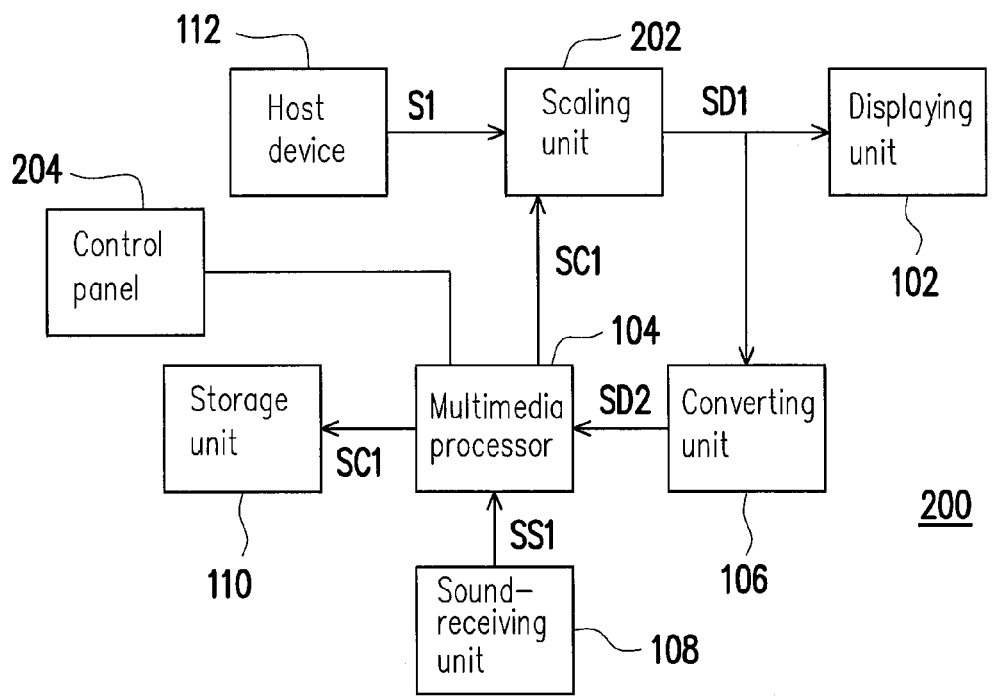
FIG. 2 is a schematic diagram of a recordable display apparatus according to another embodiment of the invention.

FIG. 2 is a schematic diagram of a recordable display apparatus according to another embodiment of the invention. Referring to FIG. 2, the difference of the recordable display apparatus 200 of the embodiment from the recordable display apparatus 100 rests in that the recordable display apparatus 200 further includes a scaling unit 202 electrically connected to the displaying unit 102 and the converting unit 106. The scaling unit 202 is used for receiving an image signal S1 from the host device 112, in which the host device 112 is, for example, mobile phone, notebook computer, tablet computer, personal computer or game console, etc. The signal format of the image signal S1, according to different host devices, includes, for example, formats of CVBS, YUV, VGA and HDMI, etc. The scaling unit 202 is able to receive the image signal S1 in different signal formats and converts the image signal S1 into a digital image signal SD1 conforming to the signal format of the displaying unit 102. For example, the resolution of the image signal S1 is converted into the resolution conforming to the displaying unit 102, or, for example, the image signal S1 is converted into a signal conforming to the transmission interface format of the displaying unit 102 such as TTL signal, MIPI signal, LVDS signal, etc. The scaling unit 202 herein should be a scalar familiar by the people of the art, for example, DDP series chip of Texas Instrument Co., which the invention is not limited to.

Figure 3:
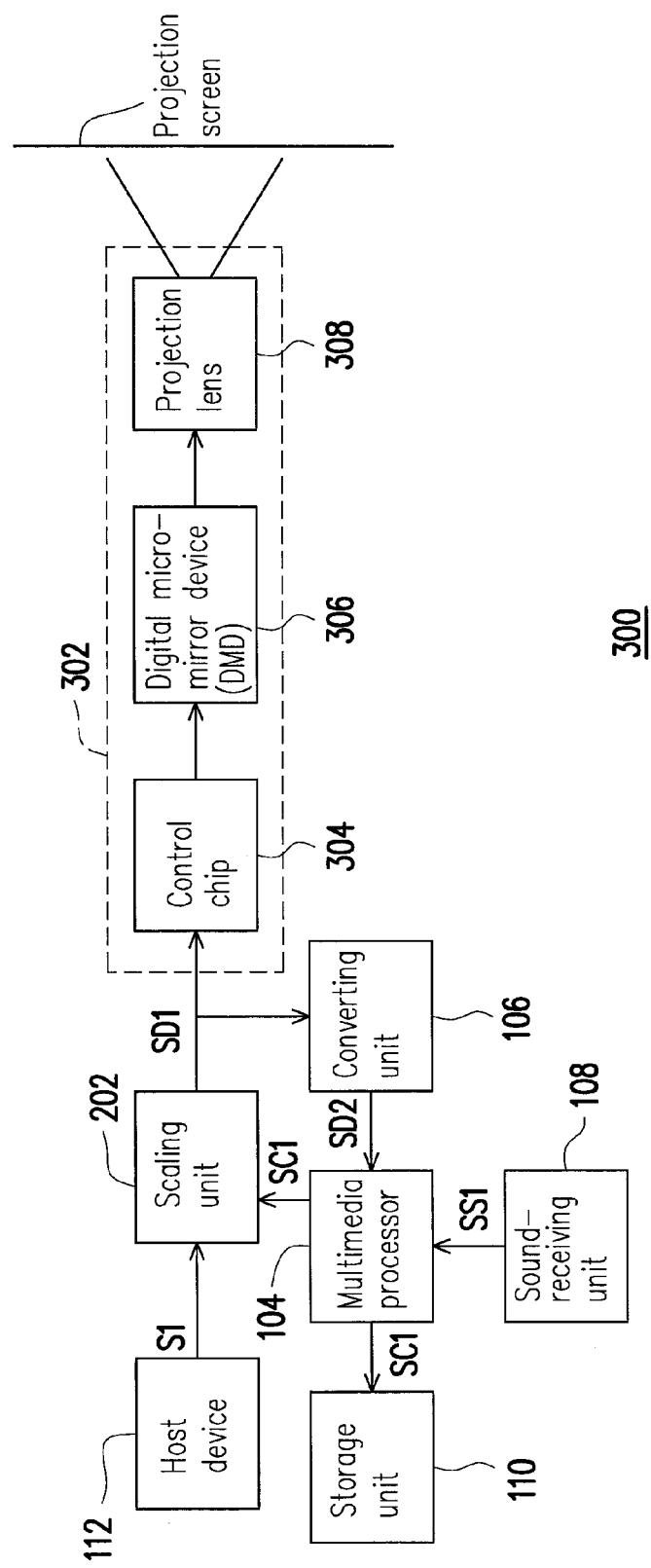
FIG. 3 is a schematic diagram of a recordable display apparatus according to yet another embodiment of the invention.

FIG. 3 is a schematic diagram of a recordable display apparatus according to yet another embodiment of the invention. Referring to FIG. 3, a recordable display apparatus 300 has an opto-mechanical unit 302 for projecting image frames according to a digital image signal SD1. The opto-mechanical unit 302 includes a control chip 304, a digital micro-mirror device (DMD) 306 and a projection lens 308. In the embodiment, the scaling unit 202 can convert the signal format of the image signal S1 into the digital image signal SD1 (a TTL signal), while the control chip 304 receives the digital image signal SD1 from the scaling unit 202 and controls the DMD 306 according to the digital image signal SD1 for projecting the images frames onto a projection screen through the projection lens 308.

Figure 4:
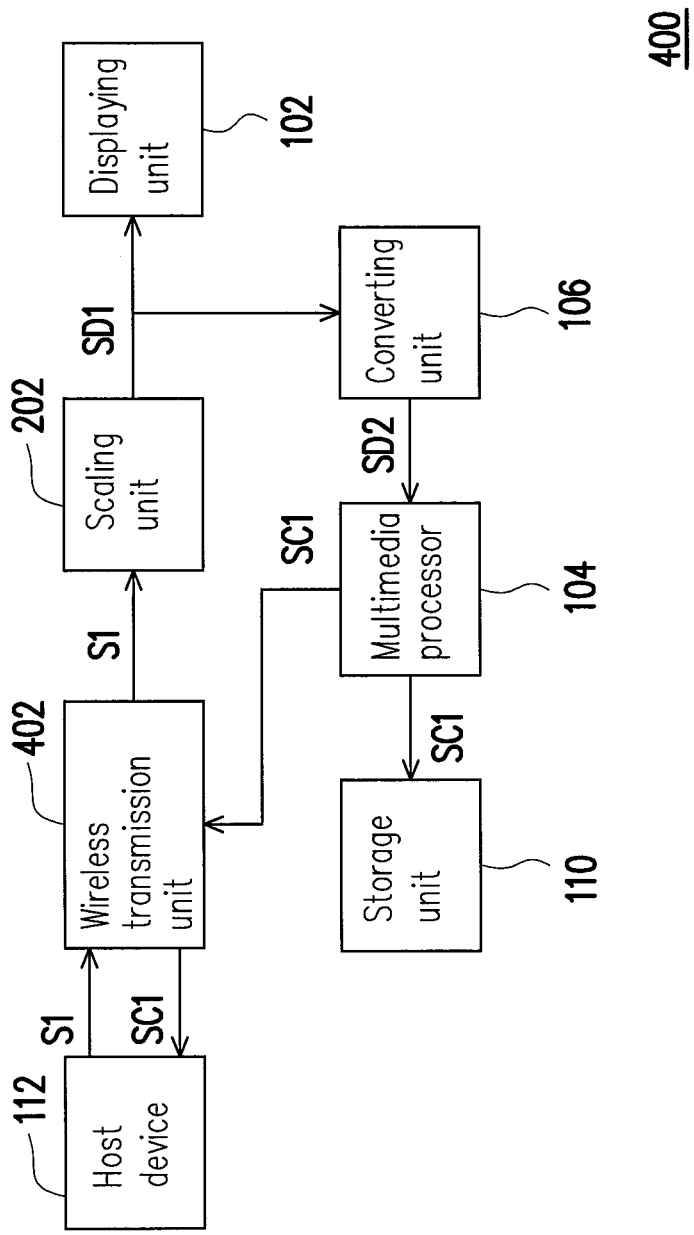
FIG. 4 is a schematic diagram of a recordable display apparatus according to yet another embodiment of the invention.

FIG. 4 is a schematic diagram of a recordable display apparatus according to yet another embodiment of the invention. Referring to FIG. 4, the difference of a recordable display apparatus 400 of the embodiment from the recordable display apparatus 200 of FIG. 2 rests in that the recordable display apparatus 400 further includes a wireless transmission unit 402 electrically connected to the multimedia processor 104 and the scaling unit 202. The wireless transmission unit 402 can wirelessly receive the image signal S1 provided by the host device 112 and then provide the image signal S1 to the scaling unit 202 for converting the signal format and producing the digital image signal SD1 to the displaying unit 102. In addition, the wireless transmission unit 402 can receive the AV recording data SC1 from the multimedia processor 104 and then wirelessly transmit the AV recording data SC1 to the host device 112 or other storage apparatuses (for example, cloud storage apparatus) for storing. By using the wireless transmission unit 402 to perform data transmission, the distance between the host device 112 and the recordable display apparatus 400 is not limited by the physical wires so as to further advance the convenience in use of the recordable display apparatus 400.

In summary, in the embodiments of the invention, the converting unit is used to convert signal format of the digital image signal into a specific image signal in an acceptable signal format by the multimedia processor. The multimedia processor is used to integrate the specific image signal from the converting unit and the sound signal produced by the sound-receiving unit during receiving and recording the ambient sound into an AV recording data, and the AV recording data is able to be stored into the fixed storage unit or the portable storage unit. By using the above-mentioned way to integrate the displayed image frames of the display apparatus and the ambient sound into the AV recording data, the user can record the operating situation of the display apparatus without worrying about too rushingly to manually record meetings or class content, which largely advances the convenience in use of the display apparatus. In addition, the multimedia processor is the signal source of the directly recorded image frames displayed by the displaying unit. Therefore, the class circumstance can be captured without additionally erecting a video camera to capture the class circumstance. Accordingly, the equipment cost is saved and there is no trouble for erecting the video camera. In particular, there is no influence of the environmental factors (such as poor screen resolution, too weak ambient light, or blocking the displaying frame by walking people) to cause the display apparatus unclearly recording the displayed image frames.

It will be apparent to those skilled in the art that the descriptions above are several embodiments of the invention only, which does not limit the implementing range of the invention. Various modifications and variations can be made to the structure of the invention without departing from the scope or spirit of the invention. The claim scope of the invention is defined by the claims hereinafter. In addition, any one of the embodiments or claims of the invention is not necessarily to achieve all of the above-mentioned objectives, advantages or features. The abstract of the disclosure is provided to comply with the rules requiring an abstract, which will allow a searcher to quickly ascertain the subject matter of the technical disclosure of any patent issued from this disclosure.

What is claimed is:

1. A recordable display apparatus, comprising:
   a displaying unit, for displaying an image frame according to a digital image signal;
   a multimedia processor;
   a converting unit, electrically connected to the multimedia processor and converting the digital image signal into a specific image signal, wherein the specific image signal has a signal format acceptable by the multimedia processor;
   a scaling unit, electrically connected to the displaying unit and the converting unit for receiving an image signal from a host device and converting the image signal into the digital image signal in a signal format corresponding to the signal format of the displaying unit, wherein the scaling unit simultaneously outputs the digital image signal to the display unit and the converting unit; and
   a sound-receiving unit, electrically connected to the multimedia processor for receiving an ambient sound to produce a sound signal, wherein the multimedia processor integrates the specific image signal and the sound signal into an audio/video recording data.

2. The recordable display apparatus as claimed in claim 1, wherein the scaling unit further outputs the audio/video recording data produced by the multimedia processor to the displaying unit so that the displaying unit displays the audio/video recording data.

3. The recordable display apparatus as claimed in claim 1, wherein the host device further comprises mobile phone, notebook computer, tablet computer, personal computer or game console.

4. The recordable display apparatus as claimed in claim 1, further comprising:
   a wireless transmission unit, electrically connected to the multimedia processor and the scaling unit, wherein the multimedia processor and the scaling unit perform data transmission with the host device through the wireless transmission unit.

5. The recordable display apparatus as claimed in claim 1, further comprising:
   a storage unit, electrically connected to the multimedia processor to store the audio/video recording data.

6. The recordable display apparatus as claimed in claim 5, wherein the storage unit comprises flash drive, memory card, recordable compact disc, hard drive or solid-state drive.

7. The recordable display apparatus as claimed in claim 1, further comprising a control panel, and the multimedia processor is controlled through the control panel.

8. The recordable display apparatus as claimed in claim 1, wherein the displaying unit is a liquid crystal display panel.

9. The recordable display apparatus as claimed in claim 1, wherein the displaying unit is an opto-mechanical unit, wherein the opto-mechanical unit comprises a control chip, a digital micro-mirror device and a projection lens.

* * * * *